US008290670B2

(12) United States Patent
Tanaka et al.

(10) Patent No.: US 8,290,670 B2
(45) Date of Patent: Oct. 16, 2012

(54) CLUTCH CONTROL DEVICE AND CLUTCH CONTROL METHOD

(75) Inventors: Tetsuji Tanaka, Abiko (JP); Masami Higaki, Ryugasaki (JP); Hideo Nakayama, Jyoso (JP); Eiichi Sakai, Ryugasaki (JP); Hidenobu Tsukada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1067 days.

(21) Appl. No.: 11/919,500

(22) PCT Filed: Apr. 26, 2006

(86) PCT No.: PCT/JP2006/308719
§ 371 (c)(1),
(2), (4) Date: Oct. 29, 2007

(87) PCT Pub. No.: WO2006/118139
PCT Pub. Date: Nov. 9, 2006

(65) Prior Publication Data
US 2009/0312922 A1 Dec. 17, 2009

(30) Foreign Application Priority Data

Apr. 27, 2005 (JP) .................................. 2005-129225
Nov. 16, 2005 (JP) .................................. 2005-332082

(51) Int. Cl.
| B60W 10/02 | (2006.01) |
| B60W 10/10 | (2006.01) |
| F16H 31/00 | (2006.01) |
| F16H 61/00 | (2006.01) |
| G06F 17/00 | (2006.01) |
| G06F 19/00 | (2006.01) |

(52) U.S. Cl. ................. 701/55; 701/56; 701/58; 477/75; 477/80; 477/124; 475/116; 475/121; 475/123; 192/3.58

(58) Field of Classification Search .................... 701/50, 701/51, 55, 56, 58; 477/73–75, 80, 122–124, 477/129–132, 149, 154, 158–162, 186; 475/116, 475/118, 120–123, 128; 192/3.51, 3.58, 192/3.63
See application file for complete search history.

(56) References Cited

U.S. PATENT DOCUMENTS 5,113,720 A    5/1992   Asayama et al.
(Continued)

FOREIGN PATENT DOCUMENTS

JP          61-55446 A      3/1986
(Continued)

OTHER PUBLICATIONS

International Search Report dated Jul. 25, 2006 with an English translation of the pertinent portions (Eight (8) pages).
(Continued)

*Primary Examiner* — Thomas Tarcza
*Assistant Examiner* — Edward Pipala
(74) *Attorney, Agent, or Firm* — Crowell & Moring LLP (57) ABSTRACT

A clutch control device includes: a plurality of hydraulic clutches built into a transmission; a clutch switching pattern storage device in which a plurality of clutch switching patterns, each defining engage/release changeover timing with which the plurality of hydraulic clutches are engaged/released are stored in correspondence to individual speed change patterns adopted by the transmission; a clutch switching pattern selection device that selects a clutch switching pattern stored in the clutch switching pattern storage device in correspondence to a speed change pattern for the transmission at a time of speed change; and a hydraulic control device that executes hydraulic control for the plurality of hydraulic clutches in correspondence to the clutch switching pattern selected by the clutch switching pattern selection device.

10 Claims, 9 Drawing Sheets

U.S. PATENT DOCUMENTS

| | | | |
|---|---|---|---|
| 5,209,141 A | | 5/1993 | Asayama et al. |
| 5,231,898 A | | 8/1993 | Okura |
| 5,443,432 A | * | 8/1995 | Fujita et al. .................. 477/155 |
| 5,505,100 A | | 4/1996 | Mitchell et al. |
| 5,697,864 A | * | 12/1997 | Watanabe ..................... 477/98 |
| 6,024,671 A | * | 2/2000 | Sawa et al. .................. 477/131 |
| 6,199,450 B1 | | 3/2001 | Carlson et al. |
| 2004/0192484 A1 | | 9/2004 | Watanabe et al. |
| 2005/0167232 A1 | | 8/2005 | Kosugi et al. |

FOREIGN PATENT DOCUMENTS

| | | |
|---|---|---|
| JP | 64-40746 A | 2/1989 |
| JP | 2-142965 | 6/1990 |
| JP | 6-11023 A | 1/1994 |
| JP | 8-105533 | 4/1996 |
| JP | 10-68430 A | 3/1998 |
| JP | 10-141487 A | 5/1998 |
| JP | 2000-145944 A | 5/2000 |
| JP | 2002-527297 A | 8/2002 |
| JP | 2002-295664 A | 10/2002 |
| TW | I222498 | 10/2004 |
| WO | WO 00/23732 A1 | 4/2000 |

OTHER PUBLICATIONS

Japanese Office Action dated Oct. 26, 2010 including English-language translation (Six (6) pages).

Extended European Search Report dated May 4, 2011 (thirteen (13) pages).

* cited by examiner

UNIT FOR Td1~Td4, Tu0~Tu5: ms
UNIT FOR Pd1~Pd3, Pu1~Pu5: mA

CLUTCH CONTROL DEVICE AND CLUTCH CONTROL METHOD

TECHNICAL FIELD

The present invention relates to a clutch control device and a clutch control method.

BACKGROUND ART

There is a clutch control device known in the related art that executes hydraulic control on a plurality of hydraulic clutches built into a transmission in a work vehicle (see patent reference literature 1).

The clutch control device disclosed in patent reference literature 1 executes variable control on a control parameter (gradual hydraulic pressure increase rate) used in the hydraulic control of a hydraulic clutch (secondary clutch) to shift from a released state to an engaged state based upon three speed-change conditions, i.e., the extent to which the accelerator is operated, the brake engagement state and the speed at the time of the speed change. A hydraulic value based upon which a hydraulic pressure is to be applied quickly to the secondary clutch must be set as another control parameter, and this hydraulic value is determined through arithmetic operation executed based upon the torque output and the like from a torque converter at the time of the speed change. The clutch control device in the related art, which controls the secondary clutch based upon the gradual hydraulic pressure increase rate and the hydraulic value at the time of the speed change as described above, is designed to minimize the extent of speed change shock.

Patent reference literature 1: Japanese Patent No. 2732096

DISCLOSURE OF THE INVENTION

Problems to be Solved by the Invention

However, in the clutch control device in the related art, which determines the control parameters through arithmetic operation, the control algorithm is bound to be complex, making it difficult to verify the reliability and stability of the control operation executed based upon such a complex control algorithm.

Means for Solving the Problems

A clutch control device according to a first aspect of the present invention includes: a plurality of hydraulic clutches built into a transmission; a clutch switching pattern storage device in which a plurality of clutch switching patterns, each defining engage/release changeover timing with which the plurality of hydraulic clutches are engaged/released are stored in correspondence to individual speed change patterns adopted by the transmission; a clutch switching pattern selection device that selects a clutch switching pattern stored in the clutch switching pattern storage device in correspondence to a speed change pattern for the transmission at a time of speed change; and a hydraulic control device that executes hydraulic control for the plurality of hydraulic clutches in correspondence to the clutch switching pattern selected by the clutch switching pattern selection device.

The transmission transmits an output of an engine via a torque converter; and the clutch control device according to the first aspect further includes: an engine rotation rate detection device that detects an engine rotation rate at the engine, and a speed ratio detection device that detects a speed ratio of the torque converter. It is preferable that the clutch switching pattern selection device selects the clutch switching pattern based upon the engine rotation rate detected by the engine rotation rate detection device and the speed ratio detected by the speed ratio detection device in correspondence to the speed change pattern for the transmission at the time of the speed change.

It is preferable that the speed change patterns for the transmission include, at least, a speed change pattern from speed-1 to speed-2, a speed change pattern from speed-2 to speed-3, a speed change pattern from speed-3 to speed-2 and a speed change pattern from speed-2 to speed-1; and that a plurality of types of clutch switching patterns are stored in correspondence to each of the speed change patterns in the clutch switching pattern storage device.

It is preferable that a plurality of types of clutch switching patterns are set in correspondence to each of the speed change patterns as combination control information indicating a specific combination of a disconnecting hydraulic control parameter for a hydraulic clutch to shift from a connected state to a disconnected state at the time of the speed change and a connecting hydraulic control parameter for a hydraulic clutch to shift from the disconnected state to the connected state at the time of the speed change. Each hydraulic control parameter may define a hydraulic pressure change profile describing a change occurring in hydraulic pressure over time.

It is preferable that the plurality of types of combination control information set in correspondence to each of the speed change patterns are sorted in correspondence to combinations each indicating specific engine rotation rate range among a plurality of engine rotation rate ranges and a specific speed ratio range among a plurality of speed ratio ranges. It is preferable that the clutch switching pattern selection device selects the clutch switching pattern based upon the engine rotation rate detected by the engine rotation rate detection device at a speed change start.

A temporary storage device in which the engine rotation rate detected at all times while the engine is being driven is temporarily stored; and an estimated rotation rate calculation device that calculates an estimated engine rotation rate with which the engine is estimated to rotate at the time of the speed change based upon the engine rotation rate detected at the speed change start and the engine rotation rate detected prior to the speed change start and is stored in the temporary storage device may be further provided. The clutch switching pattern selection device may select the clutch switching pattern by using the estimated engine rotation rate calculated by the estimated rotation rate calculation device instead of the engine rotation rate detected by the engine rotation rate detection device. The disconnecting hydraulic control parameter may be a pressure-decreasing hydraulic control parameter and the connecting hydraulic control parameter may be a pressure-increasing hydraulic control parameter.

The plurality of types of clutch switching patterns may be stored in the clutch switching pattern storage device in correspondence to each of a traveling mode and a work mode. A mode detection device that detects whether the traveling mode or the work mode is currently set may be further provided, and the clutch switching pattern selection device may select a specific clutch switching pattern among the plurality of clutch switching patterns corresponding to the mode detected by the mode detection device. A common clutch switching pattern to be used commonly in the traveling mode and in the work mode may be stored in the clutch switching pattern storage device.

In a clutch control method for executing hydraulic control of a plurality of hydraulic clutches built into a transmission according to a second aspect of the present invention, a plurality of types of clutch switching patterns each defining connecting/disconnecting changeover timing with which the plurality of hydraulic clutches are to be connected/disconnected in correspondence to individual speed change patterns for the transmission are stored; one of a plurality of types of clutch switching patterns in correspondence to a speed change pattern for the transmission at a time of a speed change is selected; and the hydraulic control of the plurality of hydraulic clutches in correspondence to the selected clutch switching pattern is executed.

A work vehicle according to a third aspect of the present invention is equipped with a clutch control device according to the first aspect.

It is to be noted that a clutch switching pattern storage device, a clutch switching pattern selection device, a hydraulic control device, an engine rotation rate detection device, a speed ratio detection device, a temporary storage device, and an estimated rotation rate calculation device may be replaced with a clutch switching pattern storage means, a clutch switching pattern selection means, a hydraulic control means, an engine rotation rate detection means, a speed ratio detection means, a temporary storage means, and an estimated rotation rate calculation means, respectively.

Effect of the Invention

According to the present invention, optimal hydraulic control, whereby a plurality of hydraulic clutches are controlled based upon a clutch switching pattern selected in correspondence to a speed change pattern and the speed change shock and the like occurring at the time of the speed change are minimized, is enabled.

BEST MODE FOR CARRYING OUT THE INVENTION

First Embodiment

Figure 9:
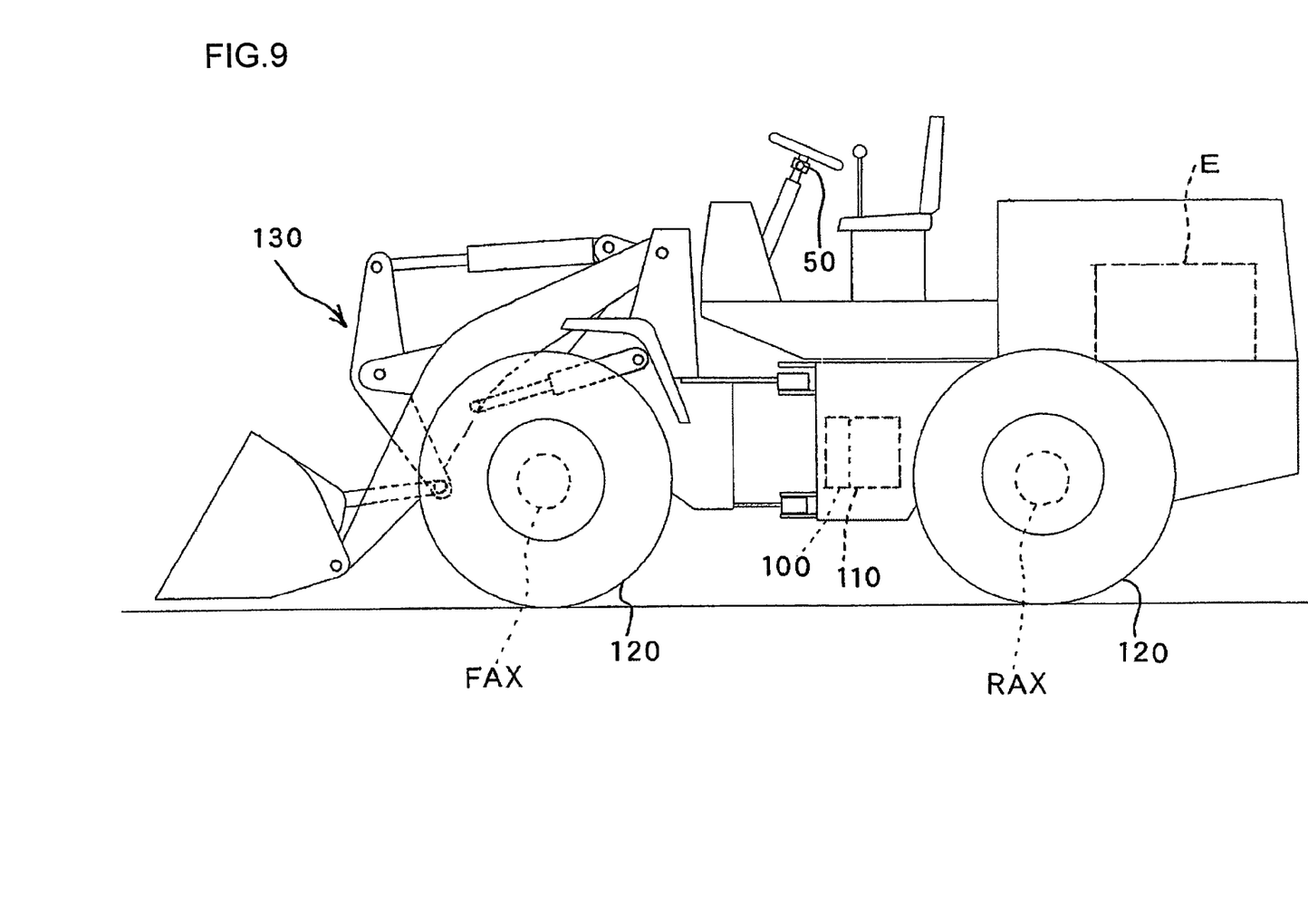
FIG. 9 is a side elevation of a wheel loader in which the clutch control device shown in FIG. 1 may be installed.

The following is an explanation of a preferred embodiment of the present invention, given in specific detail in reference to drawings. FIGS. 1 through 5 show the first embodiment of the clutch control device according to the present invention. As shown in FIG. 9, a clutch control device 100 achieved in the first embodiment is installed in a transmission 110 for a work vehicle such as a wheel loader. The output from an engine E of the wheel loader is transmitted to wheels 120 after its speed is reduced via the transmission 110.

Figure 1:
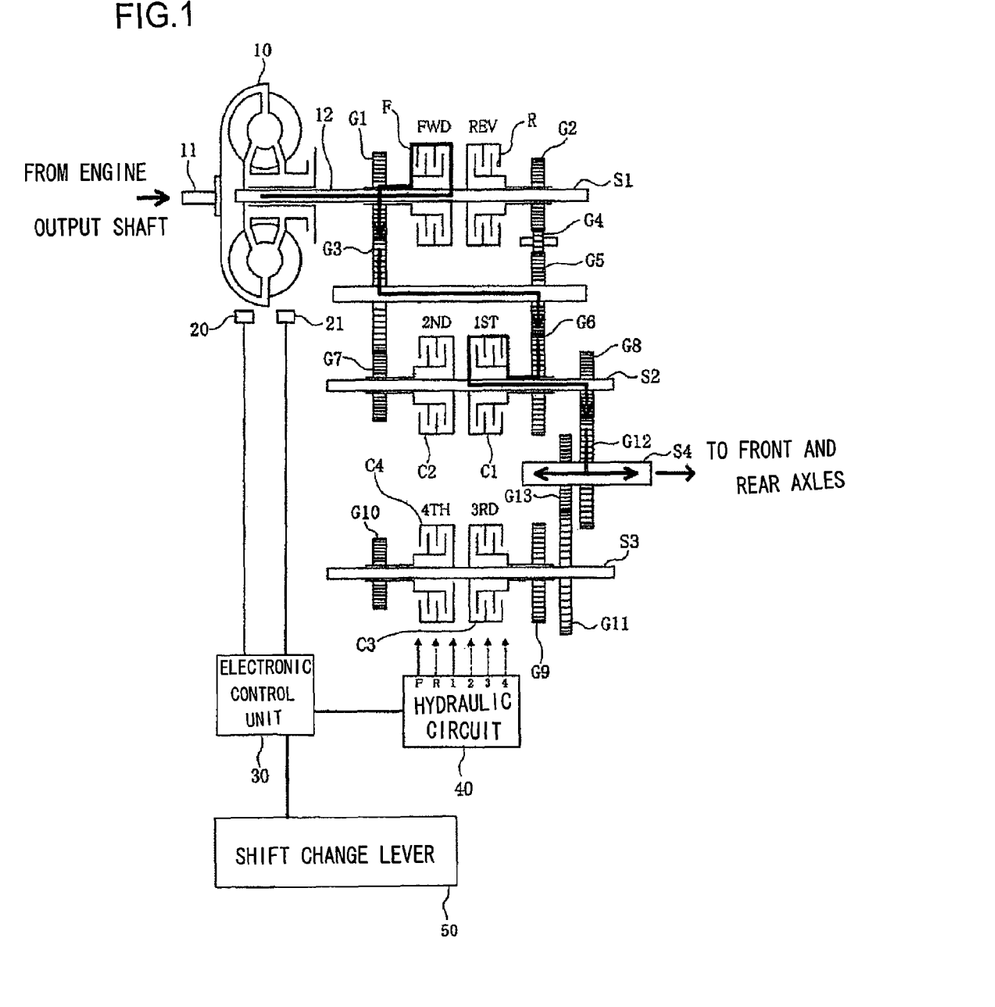
FIG. 1 shows an overall structure adopted in a clutch control device achieved in a first embodiment of the present invention.

As shown in FIG. 1, the clutch control device 100 executes hydraulic control for hydraulic clutches C1~C4 built into the transmission 110. The transmission 110 includes, as its basic components, a torque converter 10, clutch shafts S1~S3, an output shaft S4, a plurality of gears G1~G13, a forward traveling hydraulic clutch F, a rearward traveling hydraulic clutch R and the hydraulic clutches C1~C4 provided in correspondence to speeds 1~4 respectively.

The clutch control device 100 further includes an engine rotation rate detection sensor 20 that detects the engine rotation rate, a turbine rotation rate detection sensor 21 that detects the turbine rotation rate at the torque converter 10, an electronic control unit 30 and a hydraulic circuit 40. An operation signal originating from a shift change lever 50 operated by an operator to effect a change of speed range is input to the electronic control unit 30.

An input shaft 11 at the torque converter 10 is connected to the output shaft of the engine E, whereas an output shaft (turbine shaft) 12 of the torque converter 10 is linked to the clutch shaft S1. The rotation rate of the input shaft 11 at the torque converter 10 is detected as the engine rotation rate by the engine rotation rate detection sensor 20. The rotation rate of the output shaft 12 at the torque converter 10 is detected as the turbine rotation rate by the turbine rotation rate sensor 21. The speed ratio achieved at the torque converter 10 can be calculated by dividing the turbine rotation rate by the engine rotation rate.

A front axle FAX and a rear axle RAX are linked to the two ends of the output shaft S4 via differential gears and the like disposed at the front and the rear of the vehicle (see FIG. 9). The hydraulic pressures with which the hydraulic clutches F, R and C1~C4 are controlled, are increased to shift the corresponding hydraulic clutch from the released state to the engaged or connected state and are decreased to shift the corresponding clutches from the engaged state to the released or disconnected state via the hydraulic circuit 40.

As the example presented in FIG. 1 indicates, when the front traveling hydraulic clutch F and the speed-1 hydraulic clutch C1 are in the engaged state and the other hydraulic clutches R and C2~C4 are in the released state, the gear G1 and the clutch shaft S1 rotate as one and the gear G6 and the clutch shaft S2 also rotate as one. In this situation, the output torque from the engine is transmitted to the output shaft S4 sequentially via the input shaft 11 of the torque converter 10, the output shaft 12 of the torque converter 10, the clutch shaft S1, the forward traveling hydraulic clutch F, the gear G1, the gear G3, the gear G5, the gear G6, the speed-1 hydraulic clutch C1, the clutch shaft S2, the gear G8 and the gear G12 (follow the arrows in FIG. 1). As a result, the vehicle enters a speed-1 traveling state.

It is to be noted that all, the gears G1~G3 remain in the interlocked state at all times, including the gears G6 and G9 and the gears G7 and G10 not shown in the illustration provided in FIG. 1. A gear corresponding to a hydraulic clutch in the released state rotates freely and the output torque from the engine E cannot be transmitted via the freely rotating gear.

The hydraulic pressure used to control the speed-1 hydraulic clutch C1 is decreased to shift the hydraulic clutch C1 from the engaged state to the released state and, at the same time, the hydraulic pressure used to control the speed-2 hydraulic clutch C2 is increased when changing the speed of the vehicle in the speed-1 traveling state from speed-1 to speed-2. In response, the speed-2 hydraulic clutch C2 enters the engaged state in place of the speed-1 hydraulic clutch C1. As the speed-2 hydraulic clutch C2 enters the engaged state, the output torque from the engine is transmitted to the output shaft C4 sequentially via the input shaft 11 at the torque converter 10, the output shaft 12 at the torque converter 10, the clutch shaft S1, the forward traveling hydraulic clutch F, the gear G1, the gear G3, the gears G7, the speed-2 hydraulic clutch C2, the clutch shaft S2, the gear G8 and the gear G12 and, as a result, the vehicle is switched to a speed-2 traveling state.

There are two speed change patterns with which the speed changes between speed-1 and speed-2, i.e., an upshift pattern and a downshift pattern. Overall there are three upshift patterns, i.e., the upshift pattern in which the speed changes from speed-1 to speed-2, the upshift pattern in which the speed changes from speed-2 to speed-3 and the upshift pattern in which the speed changes from speed-3 to speed-4, and there are three downshift patterns, i.e., the downshift pattern with which the speed changes from speed-4 to speed-3, the downshift pattern in which the speed changes from speed-3 to speed-2 and the downshift pattern in which the speed changes from speed-2 to speed-1. In other words, there are six speed change patterns used in the embodiment.

Figure 2:
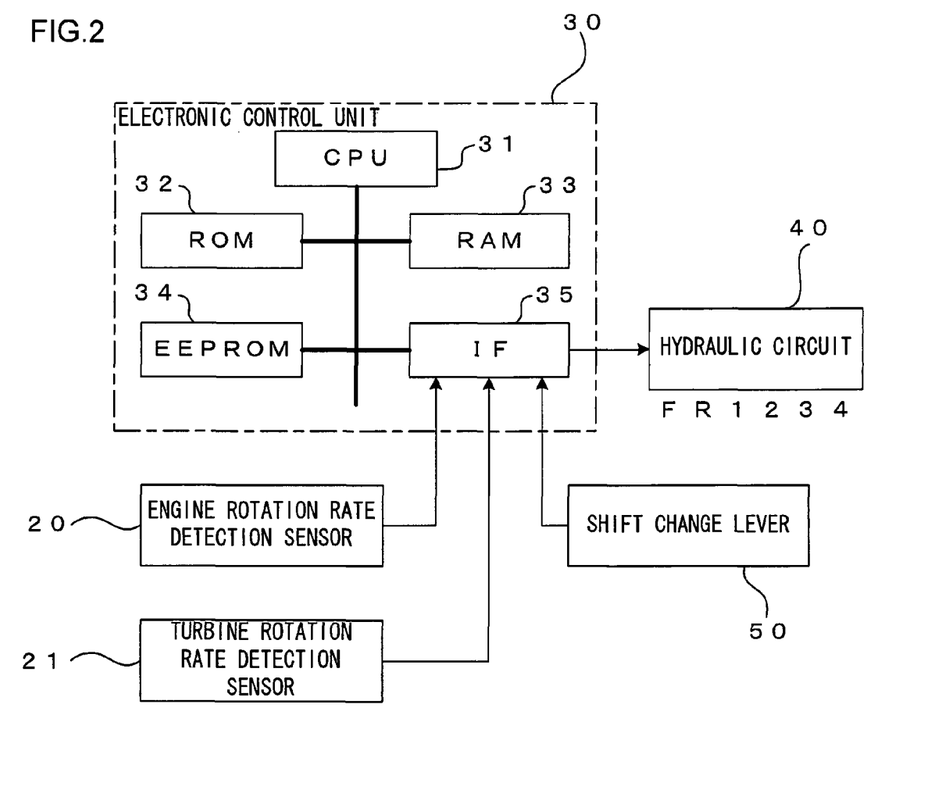
FIG. 2 is a block diagram showing an electrical structure of the clutch control device.

The electronic control unit 30 is constituted with a microcomputer that executes a specific control program. The electronic control unit 30 includes a CPU 31, a ROM 32, a RAM 33, an EEPROM 34 and an interface 35, as shown in FIG. 2. The engine rotation rate sensor 20 and the turbine rotation rate sensor 21, as well as the hydraulic circuit 40, are connected to the interface 35. In addition, an operation signal originating from the shift change lever 50 is input to the electronic control unit 30 via the interface 35.

The hydraulic circuit 40 includes hydraulic valves (not shown), each constituted with a proportional electromagnetic valve disposed in correspondence to one of the hydraulic clutches F, R and C1~C4. These hydraulic valves are each engaged in opening/closing operation in response to a drive signal provided by the electronic control unit 30 and as a hydraulic valve opens, the hydraulic pressure applied to the corresponding clutch increases, whereas as the hydraulic valve closes, the hydraulic pressure applied to the corresponding clutch decreases. While hydraulic operating fluid is supplied to the hydraulic circuit 40 from a hydraulic pump (not shown) which uses the engine E as its drive source, hydraulic operating fluid is also supplied from this hydraulic pump to the torque converter 10, a hydraulic actuator (not shown) for a work attachment 130 (see FIG. 9) and the like. In other words, the work operation load as well as the traveling load is applied to the engine E.

During a speed change, the CPU 31 executes a specific type of processing based upon the control program stored in the ROM 32. The phrase "during a speed change" is used in the following description to refer to the block of time elapsing between the speed change start and the speed change completion, while the speed is changing. The term "speed change" refers to the phase through which the vehicle speed is changed smoothly by decreasing the clutch pressure corresponding to a given speed level and increasing the clutch pressure corresponding to another speed level. The term "speed change start" refers to the time point at which the phase starts and, more specifically, it refers to the exact moment at which a speed change control command is issued. In addition, when "the speed change is underway", the vehicle is in the phase following the "speed change start" and the phrase "during the speed change" is used to refer to the entire phase.

Figure 3:
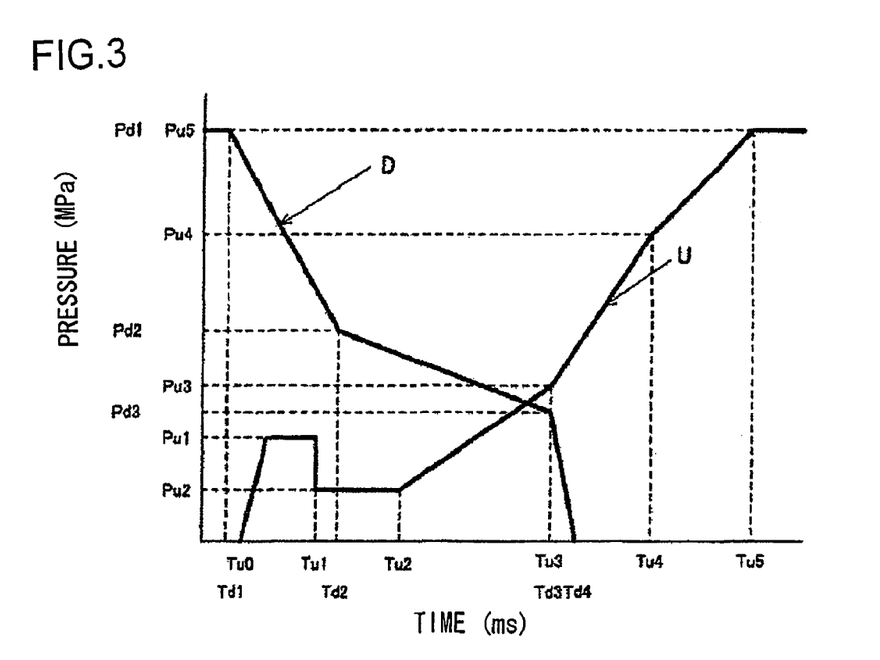
FIG. 3 is a diagram provided to facilitate an explanation of the control parameters and the hydraulic waveforms.

The control program includes built-in hydraulic pressure change profiles D and U to be used in the hydraulic control executed for the hydraulic clutch is C1~C4 during a speed change, as shown in FIG. 3. The hydraulic pressure change profiles D and U are defined by hydraulic control parameters Td1~Td4 and Tu0~Tu5 which are time-related control parameters and hydraulic control parameters Pd1~Pd3 and Pu1~Pu5, which are control parameters related to the hydraulic pressures. Namely, during a speed change, the hydraulic clutch to shift from the engaged state to the released state (hereafter referred to as a "primary clutch") is controlled in conformance to the hydraulic pressure change profile D defined by the pressure-decreasing hydraulic control parameters Td1~Td4 and Pd1~Pd3. The hydraulic clutch to shift from the released state to the engaged state (hereafter referred to as a "secondary clutch") as the primary clutch shifts into the released state, on the other hand, is controlled in conformance to the hydraulic pressure change profile U defined by the pressure-increasing hydraulic control parameters Tu0~Tu5 and Tu1~Tu5.

As indicated in FIG. 3, the pressure Pu1 immediately after the speed change start is set higher than the pressure Pu2 at the time point Tu1 in the hydraulic pressure change profile U, so as to prevent loss of drive force with hydraulic operating fluid charged in advance into the cylinder of the hydraulic clutch, which is about to shift from the released state to the engaged state. In other words, optimal values are set in the hydraulic pressure change profiles D and U based upon various conditions corresponding to specific vehicle states and traveling environments, so as to prevent drive force loss and speed change shock.

The pressure-decreasing hydraulic control parameters Td1~Td4 and Pd1~Pd3 and the pressure-increasing hydraulic control parameters Tu0~Tu5 and Pu1~Pu5 are determined in advance through tests conducted on the actual devices. Namely, as indicated in the example presented in FIG. 4, the optimal values of the individual parameters determined in correspondence to various conditions based upon the vehicle states and the traveling environments are stored in the EEPROM 34 as combination control information S. It is to be noted that the hydraulic control parameters Pd1~Pd3 and Pu1~Pu5, which are control parameters related to the hydraulic pressures, each assume a current value instead of a pressure value, since the control target, i.e. the individual hydraulic valves, is electrically controlled.

The combination control information S is managed in correspondence to each of the six different speed change patterns. In addition, the combination control information S is univocally set in correspondence to each speed change pattern based upon combinations of the engine rotation rate, low/mid/high and the speed ratio, low/mid/high. With the three engine rotation rate ranges low/mid/high indicated as EgLv=0~2 and the three speed ratio ranges achieved at the torque converter 10 indicated as EcLv=0~2, nine different sets of combination control information S are provided in correspondence to the various combinations of engine rotation rate levels EgLv=0~2 and the speed ratio levels EcLv=0~2. In other words, nine sets of combination control information S are set in correspondence to each of the six speed change patterns. While theoretically there should be 6×9=54 sets of combination control information, the actual number of sets of combination control information S actually set may be fewer than 54 if identical combination control information S is used in conjunction with different speed change patterns. Engine rotation rates in a range of, for instance, 800~1800 rpm may be designated as the low rotation level (EgLv=0), engine rotation rates in a range of 1800~2200 rpm may be designated as the mid-rotation level (EgLv=1) and engine rotation rates within a range of 2200~2400 rpm may be designated as the high rotation level (EgLv=2).

Figure 4:
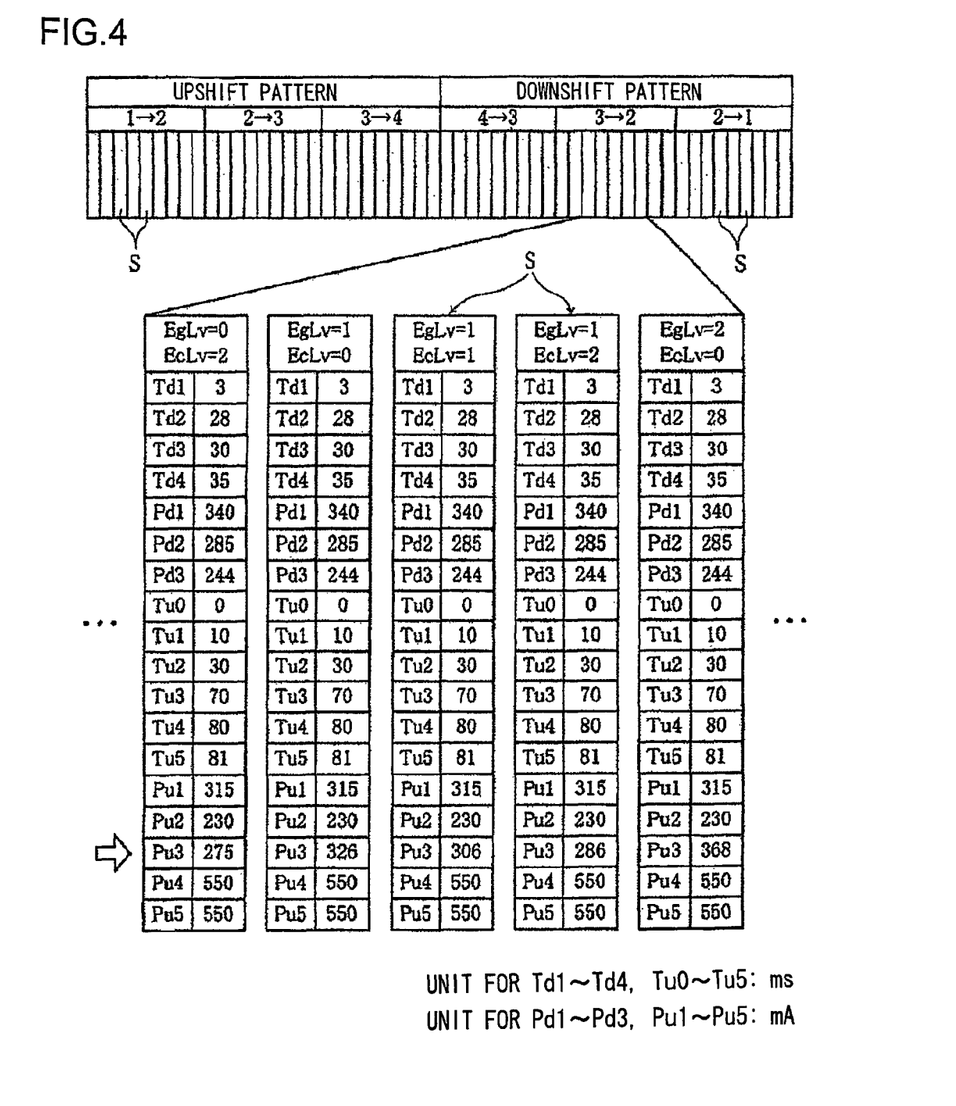
FIG. 4 illustrates the combination control information.

FIG. 4 shows five different sets of combination control information S among the nine sets of combination control information set in correspondence to the downshift pattern from speed-3 to speed-2. It is to be noted that the hydraulic pressure change profiles D and U shown in FIG. 3 correspond to the combination control information S set for the combination of low engine rotation rate level (EgLv=0) and the high speed ratio load (EcLv=2).

For instance, if the detected engine rotation rate is at EgLv=0 and the speed ratio is at EcLv=2, the CPU 31 selects the combination control information S corresponding to EgLv=0 and EcLv=2 in order to change from speed-3 to speed-2. The CPU 31 then executes the hydraulic control for the primary clutch (the speed-3 hydraulic clutch C3 in this case) and the secondary clutch (the speed-2 hydraulic clutch C2) based upon the selected combination control information S. The hydraulic control is executed in a similar manner when changing the speed in a different level combination. The specific combination control information S among different sets of combination control information is selected in correspondence to the levels of the engine rotation rate and the speed ratio as described above, since the engine rotation rate and the speed ratio at the time of the speed change are affected by the load on the engine E and the like. It is to be noted that while FIG. 4 shows sets of combination control information S indicating varying values for the hydraulic control parameter Pu3 alone, these sets of combination control information may indicate different values in correspondence to another hydraulic control parameter.

Figure 5:
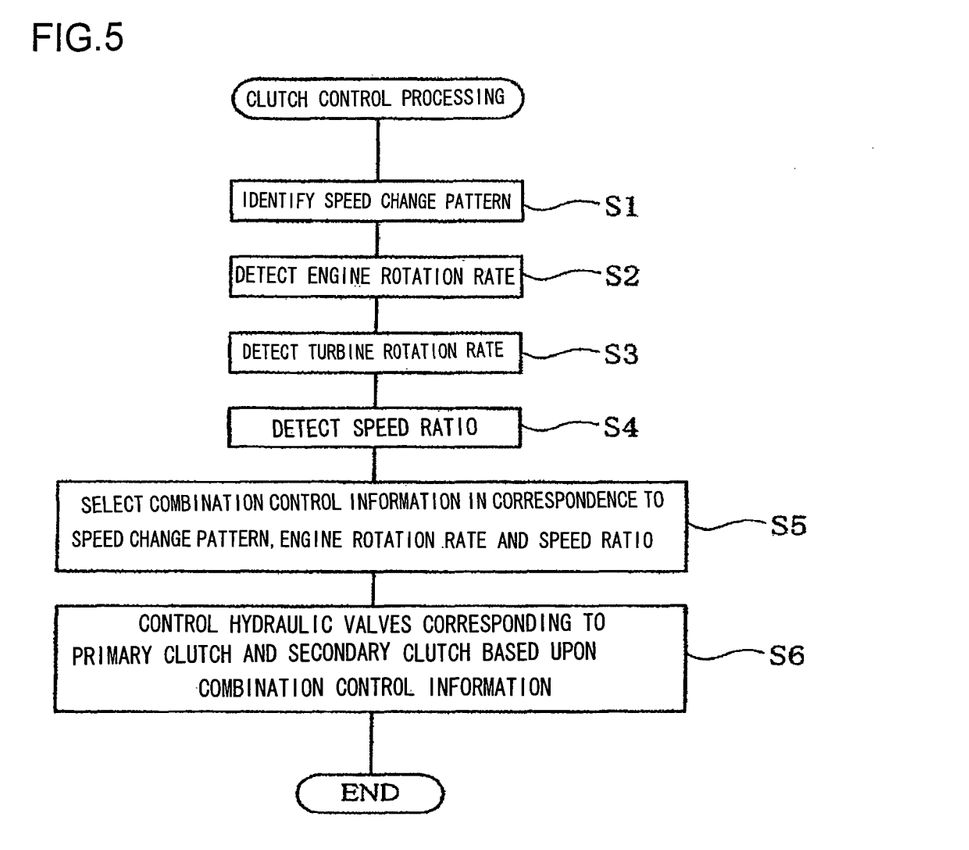
FIG. 5 presents a flowchart of the clutch control executed by the clutch control device shown in FIG. 1.

Next, in reference to FIG. 5, the procedure of the processing (clutch control method) executed by the clutch control device 100 at the time of a speed change is explained. FIG. 5 presents a flowchart of the procedure of clutch control processing executed by the electronic control unit 30 in the clutch control device 100 achieved in the first embodiment. The control program in conformance to which this clutch control processing is executed may be stored in a memory in the electronic control unit 30.

As shown in FIG. 5, the CPU 31 executing the clutch control processing at the time of a speed change first identifies the specific speed change pattern based upon which the speed change control is to be executed (step S1). The specific speed change pattern can be identified by checking a signal (speed change control command) input to the CPU 31 from the shift change lever 50 in response to, for instance, a shift change operation performed by the operator.

Immediately after identifying the speed change pattern, the CPU 31 detects, via the engine rotation rate detection sensor 20, the engine rotation rate at the current time point (at the speed change start) (step S2) and also detects, via the turbine rotation rate detection sensor 21, the turbine rotation rate at the current time point (step S3).

In addition, the CPU 31 executes a specific arithmetic operation by using the detected engine rotation rate and turbine rotation rate so as to detect the speed ratio (turbine rotation rate/engine rotation rate) achieved at the torque converter 10 (step S4).

Then, the CPU 31 selects the combination control information S indicating the optimal value in correspondence to the current speed change pattern, engine rotation rate and speed ratio and reads out this combination control information S from the EEPROM 34 (step S5).

Ultimately, the CPU 31 determines the hydraulic pressure change profiles D and U based upon the combination control information S having been read out from the EEPROM 34, and then based upon these hydraulic pressure change profiles D and U, the CPU 31 controls the hydraulic valves respectively corresponding to the primary clutch and the secondary clutch (step S 6). As a result, the primary clutch smoothly shifts from the engaged state to the released state and, at the same time, the secondary clutch smoothly shifts from the released state to the engaged state, allowing the speed change control to be completed quickly.

As explained above, the clutch control device 100 achieved in the first embodiment selects a specific clutch switching pattern corresponding to the speed change pattern from a plurality of clutch switching patterns each defining the engage/release changeover timing for the plurality of hydraulic clutches F, R and C1~C4 in correspondence to one of the six different speed change patterns with which the transmission 110 changes speeds. Then, the clutch control device 100 executes hydraulic control on the hydraulic clutches corresponding to the speed change pattern based upon the selected clutch switching pattern. The clutch switching pattern based upon which the hydraulic control is executed defines specifically how the changeover is to occur for the primary clutch and the secondary clutch. In other words, the combination control information S itself may be regarded as the clutch switching pattern. In addition, the pressure-decreasing hydraulic control parameters Td1~Td4 and Pd1~Pd3 are equivalent to releasing hydraulic control parameters and the pressure-increasing hydraulic control parameters Tu0~Tu5 and Pu1~Pu5 are equivalent to engaging hydraulic control parameters.

This control algorithm is characterized by the selection of the specific combination control information S in correspondence to the speed change pattern, the engine rotation rate and the speed ratio. The control program provides an obvious output (control operation) in correspondence to the input (the engine rotation rate and the speed ratio), since once the engine rotation rate and the speed ratio are determined, the hydraulic control parameter values are univocally determined and then, the optimal control operation is determined based upon the hydraulic pressure change profiles D and U defined by the hydraulic control parameters. Thus, control can be executed under various traveling conditions with varying loads applied to the engine E by using a simple control program, which facilitates verification of the control operation executed in correspondence to the particular engine rotation rate and speed ratio.

In other words, the clutch control device 100 in the first embodiment is able to execute control based upon a relatively simple control program, while facilitating verification of the reliability and the stability of the control operation executed as the output provided via the control program.

In addition, while the engine rotation rate and the speed ratio may assume different values depending upon the load applied to the engine E at the time of a speed change, a plurality of types of combination control information S are provided, each in correspondence to a specific combination of an engine rotation rate and a speed ratio and thus, control can be executed on the primary clutch and the secondary clutch in a desirable manner based upon the optimal set of combination control information S selected from the plurality of sets of combination control information. Consequently, regardless of the level of the load on the engine E, speed change shock can be reliably prevented.

Second Embodiment

Figure 6:
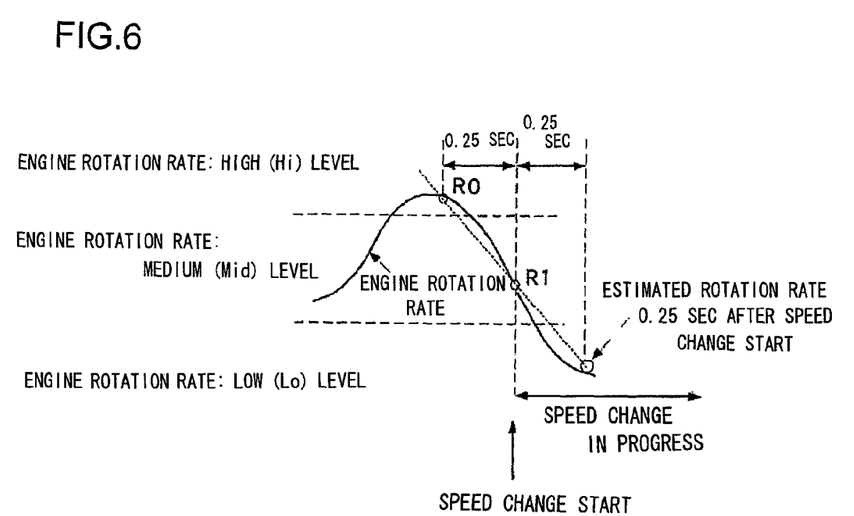
FIG. 6 is a graph showing the change in the engine rotation rate occurring over time as observed under control executed by the clutch control device achieved in a second embodiment of the present invention.
Figure 7:
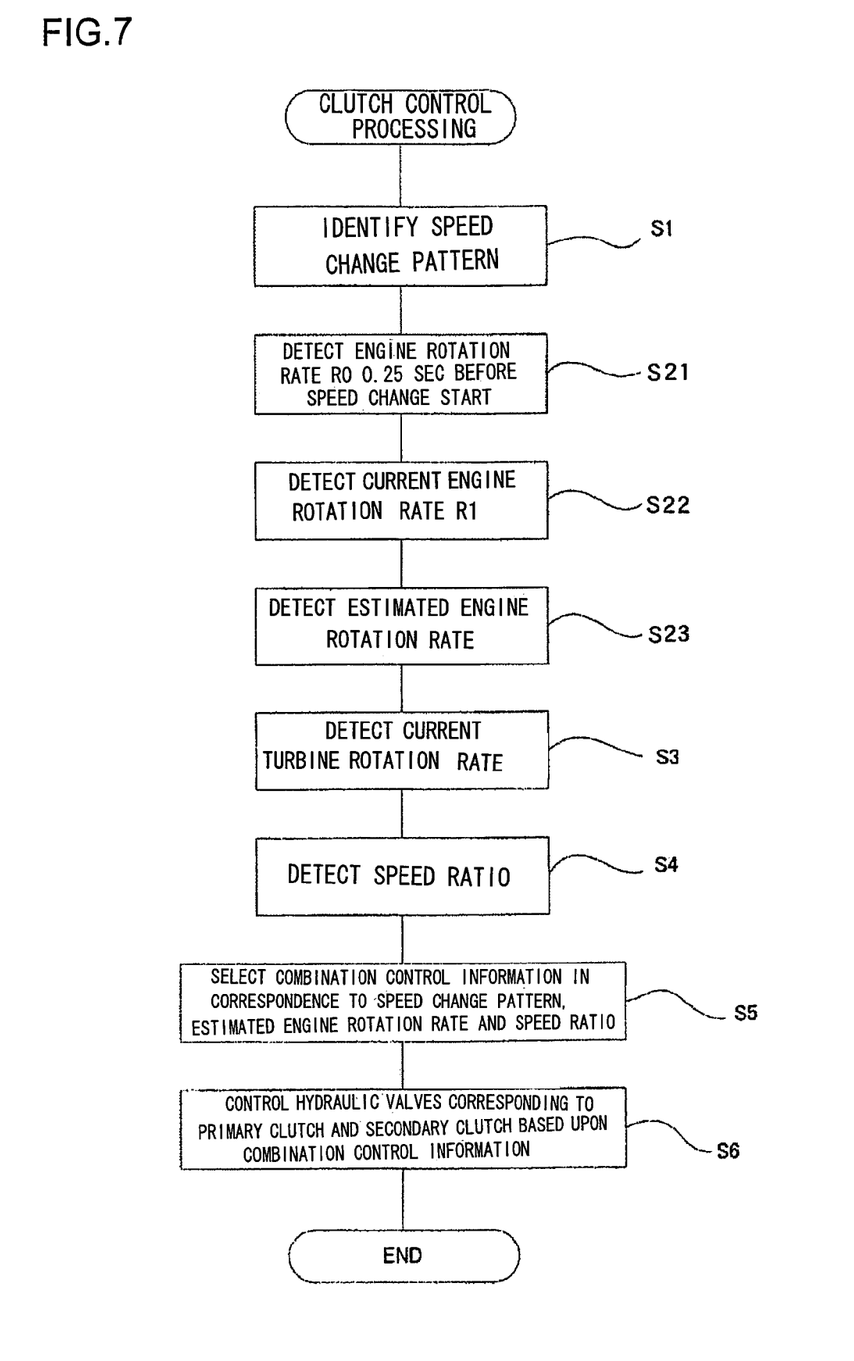
FIG. 7 presents a flowchart of the control executed by the clutch control device in the second embodiment.

Next, the clutch control device 100 achieved in the second embodiment of the present invention is explained in reference to FIGS. 6 and 7.

The clutch control device 100 in the second embodiment uses an estimated rotation rate at a time point shortly after the speed change start time point, instead of the speed change start time point itself, as the engine rotation rate based upon which the combination control information S is selected. Other structural features are similar to those of the first embodiment explained earlier. The following explanation focuses on the difference from the first embodiment.

In the graph in FIG. 6, the change in the engine rotation rate occurring over time during a period elapsing between a time point preceding the speed change start and a time point following the speed change start is indicated with the rotation rate given along the vertical axis and the time given along the horizontal axis. It is to be noted that the graph in FIG. 6 indicates the change in the engine rotation rate occurring under circumstances in which the engine rotation rate fluctuates at the time of the speed change by a greater than normal extent. Such a great extent of fluctuation in the engine rotation rate may occur when, for instance, the traveling state is switched from forward to reverse or vice versa as the accelerator is let off.

As shown in FIG. 6, the estimated rotation rate may be the rotation rate 0.25 sec after the speed change start, which may be calculated as expressed in the estimated rotation rate computation expression below by detecting the engine rotation rate 0.25 sec before the speed change start (e.g., the time point at which a speed change control command is output from the shift change lever 50) and the engine rotation rate at the speed change start. The estimated engine rotation rate 0.25 sec after the speed change start can be calculated as expressed in (1) below, in which R1 represents the engine rotation rate at the speed change start and R0 represents the engine rotation rate 0.25 sec before the speed change start.

$$\text{estimated engine rotation rate} = R1 + (R1 - R0) \qquad (1)$$

The pre-speed change start engine rotation rate can be obtained from the RAM 33 functioning as a temporary storage means where the engine rotation rate detected by the engine rotation rate detection sensor 20 is temporarily (at least over a period of 0.25 sec in this example) stored, i.e., buffered, at all times. The CPU 31 includes an estimated engine rotation rate detection means for calculating the estimated rotation rate as expressed in estimated rotation rate computation expression (1) above by reading the engine rotation rate R0 detected 0.25 sec before the speed change start and the engine rotation rate R1 detected at the speed change start from the RAM 33 in response to a speed change control command.

The specific processing procedure (clutch control method) adopted during the speed change is now explained in reference to FIG. 7. FIG. 7 presents a flowchart of the procedure of the clutch control processing executed by the electronic control unit 30 in the clutch control device 100. The control program based upon which the clutch control processing is executed may be stored in, for instance, the memory in the electronic control unit 30. It is to be noted that in FIG. 7, the same step numbers are assigned to steps in which processing similar to that executed in the first embodiment, as shown in FIG. 5, is executed.

The CPU 31 identifies the speed change pattern based upon the clutch control processing command (step S1). Immediately after identifying the speed change pattern, the CPU 31 reads the rotation rate R0 detected 0.25 sec before the speed change start from the RAM 33 (step S 21). Then, the engine rotation rate R1 at the speed change start is detected (step S 22) and the engine rotation rate 0.25 sec after the speed change start is detected by executing arithmetic processing based upon estimated rotation rate computation expression (1) (step S 23). In addition, the CPU detects the turbine rotation rate at the speed change start via the turbine rotation rate detection sensor 21 (step S 3).

Subsequently, the CPU 31 detects the speed ratio (turbine rotation rate/estimated engine rotation rate) achieved via the torque converter 10 (step S4) by executing a specific arithmetic operation based upon the estimated engine rotation rate 0.25 sec after the speed change start and the turbine rotation rate at the speed change start. It is to be noted that the speed ratio may be calculated by using an estimated turbine rotation rate calculated in a manner similar to the estimated engine rotation rate, which is calculated as expressed in estimated rotation rate computation expression (1).

Then, the CPU 31 selects the combination control information S indicating the optimal value in correspondence to the speed change pattern ascertained based upon the speed change command, the estimated engine rotation rate 0.25 sec after the speed change start and the speed ratio and reads out the selected combination control information S from the EEPROM 34 (step S 5).

Ultimately, the CPU 31 determines the hydraulic pressure change profiles D and U based upon the combination control information S having been read out from the EEPROM 34, and then based upon these hydraulic pressure change profiles D and U, the CPU 31 controls the hydraulic valves respectively corresponding to the primary clutch and the secondary clutch (step S 6).

The control algorithm adopted in the second embodiment described above is advantageous in that the optimal speed change waveform can be selected when the engine rotation rate fluctuates greatly at the time of a speed change.

As the graph in FIG. 6 indicates, while the engine rotation rate at the speed change start is in the medium-range (Mid) level (EgLv=1), the engine rotation rate is reduced to the low (Lo) level (EgLv=0) during the actual speed change. When the engine rotation rate fluctuates significantly during the speed change, as in this case, the speed change waveform corresponding to the engine rotation rate (engine rotation rate level) at the speed change start may not be optimal. Accordingly, the optimal speed change waveform is selected in correspondence to the estimated engine rotation rate, i.e., the engine rotation rate at a time point with a specific delay following the speed change start, in the second embodiment.

It is to be noted that while the engine rotation rate 0.25 sec before the speed change start is detected and the engine rotation rate 0.25 sec after the speed change start is estimated in the second embodiment, these time offsets do not, need to be 0.25 sec and other time points preceding and succeeding the speed change start by very small specific lengths of time may be selected. Generally speaking, the speed change is effected in 1~2 seconds and, accordingly, the time points preceding the speed change start and the time point following the speed change start, based upon which the estimated engine rotation rate is to be calculated, should be set within this 1~2 sec range.

Third Embodiment

Next, the clutch control device achieved in the third embodiment of the present invention is explained.

The clutch-control device achieved in the third embodiment is installed in a work vehicle (e.g., a wheel loader) that can be operated in an auto mode, in which the speed range matching conditions such as the vehicle speed and the engine rotation rate is automatically selected.

Figure 8:
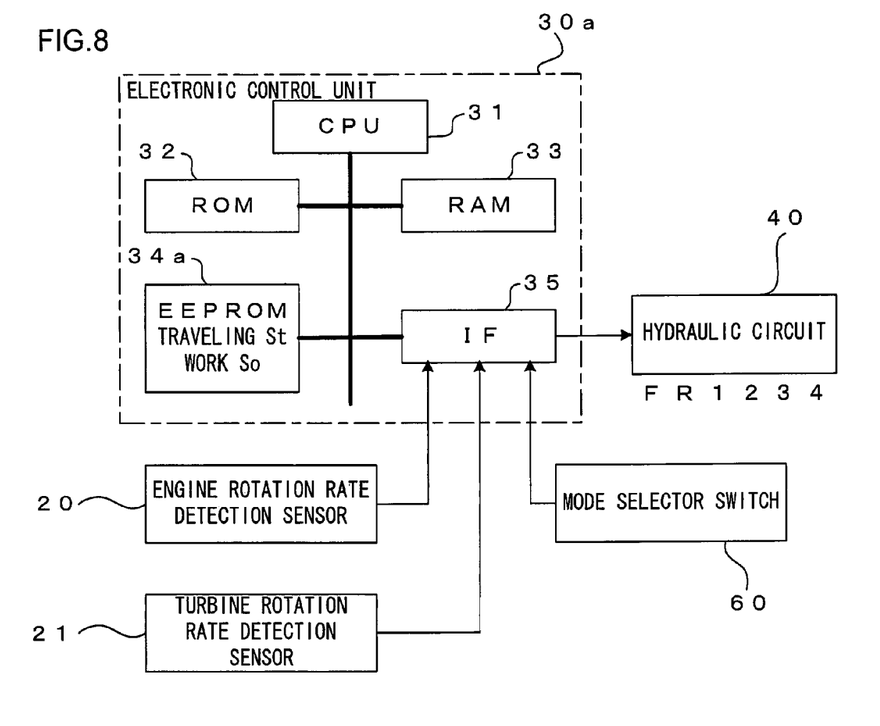
FIG. 8 is a block diagram showing the electrical structure of the clutch control device achieved in a third embodiment of the present invention.

FIG. 8 presents a block diagram showing the electrical structure adopted in the clutch control device in the third embodiment. The auto mode may be selected in conjunction with a traveling mode selected when the work vehicle is engaged in a traveling operation and in conjunction with a work mode selected when the work vehicle is engaged in work such as a bucket operation, and either the traveling mode or the work mode can be selected via a mode selector switch 60. An operation signal output from the mode selector switch 60 in response to an operation by the operator is input to an electronic control unit 30a of the clutch control device via an interface 35.

In an EEPROM 34a at the electronic control unit 30, combination control information St and combination control information So respectively corresponding to the traveling mode and the work mode are stored. If the traveling mode is selected, the CPU 31 selects combination control information indicating the optimal value corresponding to the current speed change pattern, engine rotation rate and speed ratio from the traveling mode combination control information St. If, on the other hand, the work mode is selected, the CPU 31 selects combination control information indicating the optimal value corresponding to the current speed change pattern, engine rotation rate and speed ratio from the work mode combination control information So.

Then, the CPU 31 determines the hydraulic pressure change profiles D and U based upon the combination control information St or So having been read, out from the EEPROM 34a, and based upon these hydraulic pressure change profiles D and U, the CPU 31 controls the hydraulic valves respectively corresponding to the primary clutch and the secondary clutch.

Different values, ideal for different operating states, i.e., the traveling state and the work state assumed by the work vehicle, are set in the traveling mode combination control information St and the work mode combination control information So stored in the EEPROM 34a. However, if the traveling mode combination control information and the work mode combination control information corresponding to a given set of engine rotation rate/speed ratio conditions are identical to each other, a single set of common combination control information is stored, so as to ensure efficient utilization of the memory capacity of the EEPROM 34a.

While the clutch control device is mounted in the transmission of a work vehicle in the first through third embodiment described above, the present invention may be adopted in the transmission of a vehicle other than a work vehicle. In addition, the clutch control device achieved in any of the first through third embodiment described above may be installed in an HST traveling circuit instead of a traveling circuit equipped with the torque converter 10. While the hydraulic clutches F, R and C1~C4 are all positive-type hydraulic clutches, the present invention may be adopted in conjunction with negative-type hydraulic clutches. In such a case, the combination control information S must be adjusted so as to best support the negative-type hydraulic clutches.

In the first through third embodiment described above, the combination control information S is set in correspondence to three different engine rotation rate levels and three different speed ratio levels. However, the present invention is not limited to this example and the combination control information S may be provided in correspondence to four different engine rotation rate levels and speed ratio levels dr two engine rotation rate levels and speed ratio levels. Furthermore, while the transmission 110 includes the hydraulic clutches C1~C4 respectively corresponding to speed-1~speed-4, the present invention is not limited to this example and the transmission may be equipped with hydraulic clutches corresponding to five or more different speed ranges or may be equipped with hydraulic clutches corresponding to three or fewer speed ranges.

While the clutch control device, achieved in the first or the second embodiment is adopted in a manual transmission with which the speed range is switched in response to an operation of the shift change lever 50 by the operator, the clutch control devices in the first and second embodiments may be obviously adopted in an automatic transmission with which the speed range is switched automatically.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosures of the following priority applications are herein incorporated by reference:

Japanese Patent Application No. 2005-129225 filed Apr. 27, 2005

Japanese Patent Application No. 2005-332082 filed Nov. 16, 2005

The invention claimed is:

1. A clutch control device, comprising:
   a plurality of hydraulic clutches built into a transmission that transmits an output of an engine via a torque converter;
   a speed change pattern determination device that determines a speed change pattern that represents a speed change of the transmission including an upshift pattern and a downshift pattern;
   a clutch switching pattern storage device in which a plurality of clutch switching patterns, each defining engage/release changeover timing with which the plurality of hydraulic clutches are engaged/released are stored in correspondence to individual speed change patterns adopted by the transmission;
   a clutch switching pattern selection device that selects a clutch switching pattern stored in the clutch switching pattern storage device in correspondence to a speed change pattern for the transmission determined by the speed change pattern determination device at a time of speed change;
   a hydraulic control device that executes hydraulic control for the plurality of hydraulic clutches in correspondence to the clutch switching pattern selected by the clutch switching pattern selection device;
   an engine rotation rate detection device that detects an engine rotation rate at the engine; and
   a speed ratio detection device that detects a speed ratio of the torque converter; wherein
   the transmission executes a speed change by shifting a first clutch among the plurality of hydraulic clutches from a connected state to a disconnected state and shifting a second clutch among the plurality of hydraulic clutches from a disconnected state to a connected state;

a plurality of types of clutch switching patterns are set in correspondence to each of the speed change patterns as combination control information indicating a specific combination of a pressure-decreasing hydraulic control parameter for releasing the first clutch and a pressure-increasing hydraulic control parameter for engaging the second clutch based on the engine rotation rate and the speed ratio;

an engine rotation rate range is divided into a plurality of levels according to a value of the engine rotation rate and a speed ratio range is divided into a plurality of levels according to a value of the speed ratio, and for each speed change pattern, the plurality of types of combination control information are prepared in correspondence to combinations each indicating a specific level of the engine rotation rate among the plurality of engine rotation rate levels and a specific level of the speed ratio among the plurality of speed ratio levels;

the clutch switching pattern selection device selects one clutch switching pattern corresponding to a level of the engine rotation rate detected by the engine rotation rate detection device and a level of the speed ratio detected by the speed ratio detection device, based upon the speed change pattern determined by the speed change pattern determination device at the time of the speed change; and the hydraulic control device executes hydraulic control for the first clutch and the second clutch according to the combination control information indicating a specific combination of a pressure-decreasing hydraulic control parameter and a pressure-increasing hydraulic control parameter in correspondence to the clutch switching pattern selected by the clutch switching pattern selection device at the time of the speed change.

2. A clutch control device according to claim 1, wherein:
the speed change patterns for the transmission include, at least, a speed change pattern from speed-1 to speed-2, a speed change pattern from speed-2 to speed-3, a speed change pattern from speed-3 to speed-2 and a speed change pattern from speed-2 to speed-1; and
a plurality of types of clutch switching patterns are stored in correspondence to each of the speed change patterns in the clutch switching pattern storage device.

3. A clutch control device according to claim 1, wherein:
each hydraulic control parameter defines a hydraulic pressure change profile describing a change occurring in hydraulic pressure over time.

4. A clutch control device according to claim 1, wherein:
the clutch switching pattern selection device selects the clutch switching pattern based upon the engine rotation rate detected by the engine rotation rate detection device at a speed change start.

5. A clutch control device according to claim 1, further comprising:
a temporary storage device in which the engine rotation rate detected at all times while the engine is being driven is temporarily stored; and
an estimated rotation rate calculation device that calculates an estimated engine rotation rate with which the engine is estimated to rotate at the time of the speed change based upon the engine rotation rate detected at the speed change start and the engine rotation rate detected prior to the speed change start and is stored in the temporary storage device, wherein:
the clutch switching pattern selection device selects the clutch switching pattern by using the estimated engine rotation rate calculated by the estimated rotation rate calculation device instead of the engine rotation rate detected by the engine rotation rate detection device.

6. A work vehicle comprising:
a clutch control device according to claim 1.

7. A clutch control device according to claim 1, wherein:
the plurality of types of clutch switching patterns are stored in the clutch switching pattern storage device in correspondence to each of a traveling mode and a work mode.

8. A clutch control device according to claim 7, further comprising:
a mode detection device that detects whether the traveling mode or the work mode is currently set, wherein:
the clutch switching pattern selection device selects a specific clutch switching pattern among the plurality of clutch switching patterns corresponding to the mode detected by the mode detection device.

9. A clutch control device according to claim 7, wherein:
a common clutch switching pattern to be used commonly in the traveling mode and in the work mode is stored in the clutch switching pattern storage device.

10. A clutch control method for executing hydraulic control of a plurality of hydraulic clutches built into a transmission that transmits an output of an engine via a torque converter, comprising:
determining, by a speed change pattern determination device, a speed change pattern that represents a speed change of the transmission including an upshift pattern and a downshift pattern;
storing a plurality of types of clutch switching patterns each defining connecting/disconnecting changeover timing with which the plurality of hydraulic clutches are to be connected/disconnected in correspondence to individual speed change patterns for the transmission;
selecting, by a clutch switching pattern selection device, one of a plurality of types of clutch switching patterns in correspondence to a speed change pattern for the transmission at a time of a speed change;
executing, by a hydraulic control device, the hydraulic control of the plurality of hydraulic clutches in correspondence to the selected clutch switching pattern;
detecting an engine rotation rate at the engine via an engine rotation rate detection device; and
detecting a speed ratio of the torque converter via a speed ratio detection device; wherein
the transmission executes the speed change by shifting a first clutch among the plurality of hydraulic clutches from a connected state to a disconnected state and shifting a second clutch among the plurality of hydraulic clutches from a disconnected state to a connected state;
a plurality of types of clutch switching patterns are set in correspondence to each of the speed change patterns as combination control information indicating a specific combination of a pressure-decreasing hydraulic control parameter for releasing the first clutch and a pressure-increasing hydraulic control parameter for engaging the second clutch based on the engine rotation rate and the speed ratio;
an engine rotation rate range is divided into a plurality of levels according to a value of the engine rotation rate and a speed ratio range is divided into a plurality of levels according to a value of the speed ratio, and for each speed change pattern, the plurality of types of combination control information are prepared in correspondence to combinations each indicating a specific level of the engine rotation rate among the plurality of engine rotation rate levels and a specific level of the speed ratio among the plurality of speed ratio levels;

the selected clutch switching pattern corresponds to a level of the engine rotation rate detected by the engine rotation rate detection device and a level of the speed ratio detected by the speed ratio detection device, based upon the speed change pattern determined by the speed change pattern determination device at the time of the speed change; and the hydraulic control device executes hydraulic control for the first clutch and the second clutch according to the combination control information indicating a specific combination of a pressure-decreasing hydraulic control parameter and a pressure-increasing hydraulic control parameter in correspondence to the clutch switching pattern selected by the clutch switching pattern selection device at the time of the speed change.

* * * * *